United States Patent [19]

Scoggins et al.

[11] Patent Number: 5,128,445
[45] Date of Patent: Jul. 7, 1992

[54] METHOD TO RECOVER POLY(ARYLENE SULFIDE) POLYMERS WITH WATER-POLAR ORGANIC COMPOUND

[75] Inventors: Lacey E. Scoggins, 1310 SE. Lariat Dr., Bartlesville, Okla.; Toshiuki Asakura, 40-2-203 Yagumocho, Showa-ku, Nagoya 466; Keiji Nakagawa, 1-81 Ikegamidai, Midori-ku, Nagoya 458, Japan

[73] Assignee: Phillips Petroleum Company, Bartlesville, Okla.

[21] Appl. No.: 539,110

[22] Filed: Jun. 14, 1990

[51] Int. Cl.$^5$ .............................................. C08G 75/16
[52] U.S. Cl. .................................... 528/492; 521/189; 528/388; 528/391; 528/499
[58] Field of Search ............... 528/492, 388, 391, 499; 521/189

[56] References Cited

U.S. PATENT DOCUMENTS

| | | | |
|---|---|---|---|
| 4,071,509 | 1/1978 | Edmonds | 260/79 |
| 4,301,274 | 11/1981 | Campbell | 528/388 |
| 4,415,729 | 11/1983 | Scoggins et al. | 528/388 |
| 4,524,200 | 6/1985 | Sherk et al. | 528/388 |
| 4,645,825 | 2/1987 | Idel et al. | 528/388 |
| 4,645,826 | 2/1987 | Iizuka et al. | 528/388 |
| 4,748,231 | 5/1988 | Nesheiwat | 528/486 |
| 4,769,442 | 9/1988 | Iwasaki et al. | 528/388 |
| 4,786,712 | 11/1988 | Ostlinning et al. | 528/388 |
| 4,801,664 | 1/1989 | Nesheiwat et al. | 525/537 |
| 4,808,694 | 2/1989 | Edmonds et al. | 528/125 |
| 4,812,539 | 3/1989 | Iizuka et al. | 526/62 |
| 4,841,022 | 6/1989 | Nakamura et al. | 528/487 |

FOREIGN PATENT DOCUMENTS

| | | |
|---|---|---|
| 240016 | 2/1987 | European Pat. Off. . |
| 3723071 | 1/1989 | Fed. Rep. of Germany . |
| 59-49232 | 3/1984 | Japan . |
| 60-115631 | 6/1985 | Japan . |
| 60-235838 | 11/1985 | Japan . |
| 36170 | 10/1986 | Japan . |
| 61-225217 | 10/1986 | Japan . |
| 1-33136 | 2/1989 | Japan . |

*Primary Examiner*—Harold D. Anderson
*Attorney, Agent, or Firm*—Beverly M. Dollar

[57] ABSTRACT

A method is provided for recovering poly(arylene sulfide) polymers characterized by low ash and oligomer concentrations and having a larger particle size, which method comprises, during recovery, adding or maintaining a sufficient amount of a polar organic compound to the reaction mixture immediately after solidifying the poly(arylene sulfide) polymer.

13 Claims, No Drawings

METHOD TO RECOVER POLY(ARYLENE SULFIDE) POLYMERS WITH WATER-POLAR ORGANIC COMPOUND

FIELD OF THE INVENTION

This invention relates to processes for the production and recovery of poly(arylene sulfide) polymers characterized by low oligomer and ionic impurity concentrations having desirable particle form.

BACKGROUND OF THE INVENTION

A basic process for the production of poly(arylene sulfide) polymers from polyhalo-substituted aromatic compounds, wherein the halogen atoms attached to ring carbon atoms react with an alkali metal sulfide in the presence of a polar organic compound at an elevated temperature, is generally known in the art. Due to a continually growing attractiveness towards thermoplastic polymeric resins, a great amount of work has been completed which resulted in the disclosure of methods for both batch and continuous operations to produce poly(arylene sulfide)s from polyhaloaromatic compounds having at least two halogen substituents per molecule. Certain processes for producing poly(arylene sulfide) resins result in a liquid reaction mixture comprising a liquid-phase polymer and a polar organic compound. In order for the polymers produced in these processes to be useful in commercial applications, the polymers must first be recovered from the reaction mixture.

One method of recovering the poly(arylene sulfide) resins from the reaction mixture is by a process referred to as the "flash recovery method". In this process the polar organic compound and some of the non-polymeric components of the reaction mixture are vaporized, leaving behind the polymer and non-volatile components. The polymer recovered by this process is generally in the form of a powdery resin. This powdery resin has, among other things, (1) proven to be difficult to filter, (2) resulted in a product that when dried is excessively dusty, (3) necessitated pelletizing the powder for extrusion purposes, and (4) resulted in other problems commonly associated with products of relatively low bulk density.

Another process used for the recovery of poly(arylene sulfide) resins from a reaction mixture is the addition of a compound functioning as a separation agent. This compound should be soluble in the reaction mixture and a nonsolvent for the polymeric resin. When certain amounts of a separation agent are used to recover the polymer from the liquid mixture, the process results in the recovery of a polymer in the form of a powder. When certain other amounts of a separation agent are used to recover the polymer from the reaction mixture, the process results in the recovery of a polymer in the form of relatively large, coarse particles.

Even though the recovery process described above can result in the formation of large polymer particles, it has been noted that the polymer still has a relatively high ash and oligomer content. The presence of ash in the polymer is undesirable since it can reduce the molding efficiency of the polymer upon injection molding applications and can also harm the electrical properties of the polymer. A relatively high oligomer content in the polymer also is disadvantageous in molding and other processing applications.

It would therefore be desirable to have a method of recovering a poly(arylene sulfide) resin from a reaction mixture which served to reduce ash and oligomer content as well as to produce large polymer particles.

STATEMENT OF THE INVENTION

In accordance with this invention, a method is provided for recovering a particulate poly(arylene sulfide) polymer from a completed polymerization reaction resulting in a liquid reaction mixture comprising a liquid-phase poly(arylene sulfide), a polar organic compound, and water. The recovery is effected by cooling the reaction mixture containing the liquid-phase poly(arylene sulfide), polar organic compound and water to the point of solidification of the polymer to form a polar organic compound slurry, and thereafter adding or maintaining a sufficient amount of polar organic compound in order to result in the recovery of low oligomer and ash content polymer of granular form. For purposes herein, the term "completed polymerization reaction" is meant to denote that point at which the polymer is recovered, regardless of whether all reactants have been consumed.

For purposes herein, the expression "oligomer" refers to the acetone-extractable content of the poly(arylene sulfide). More specifically, the poly(arylene sulfide) is extracted using acetone in a Soxhlet extractor, and after acetone has been evaporated from the acetone extracting solution, the ratio of the resulting residue with respect to the poly(arylene sulfide) is determined. It is generally desired that the acetone-extractable content be 1.5 wt. % or below, preferably 1.0 wt. % or below.

For purposes herein, the expression "ash content" refers to the concentration of inorganic compounds produced as a result of the oxidation of ionic impurities in the poly(arylene sulfide). More specifically, poly(arylene sulfide) is baked at 560° C. for 6 hours in a platinum crucible. Then, the weight of the residue is measured. It is generally desired that the ash content be controlled at 0.5 wt. % or below, preferably 0.3 wt. % or below.

A more complete appreciation of the invention and many attendant advantages thereof will be readily obtained by reference to the following detailed description when considered in connection with the accompanying figure briefly described below.

DETAILED DESCRIPTION OF THE INVENTION

The process of the present invention is suitable for use in recovering poly(arylene sulfide) resins produced by any method that results in a reaction mixture comprising a liquid-phase poly(arylene sulfide), a polar organic compound, and water.

Examples of processes that will produce reaction mixtures which can be treated by the process of this invention are those wherein polyhalo-substituted aromatic compounds are reacted with sulfur-containing reactants in a polar organic compound, optionally with polymerization modifying compounds, either in batch or continuous operations. Reaction mixtures wherein the components are premixed to form complexes before all of the components are brought together under polymerization conditions can also be used.

Preferably, the poly(arylene sulfide) polymers treated by the process of this invention are poly(phenylene sulfide) polymers which contain at least 90 mol % of the p-phenylene sulfide unit

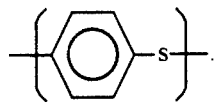

In general, the amount of polar organic compound required to be added or maintained is affected by (1) the amount of water present in the reaction mixture, (2) the amount of poly(arylene sulfide) polymer present in the reaction mixture, (3) the amount of polar organic compound present in the reaction mixture, (4) the degree of crystallinity exhibited by the poly(arylene sulfide) polymer when in its annealed, solid state, (5) the presence of any other species in the reaction mixture which can affect recovery, (6) the molecular weight of the poly(arylene sulfide) polymer, (7) the particle size desired for the resulting separated poly(arylene sulfide) polymer, and (8) the degree to which the ash and oligomer content is to be lowered. More specifically, larger water to polar organic compound ratios will generally produce relatively larger particle size in the resulting separated poly(arylene sulfide) polymer, relatively more water is required for relatively less crystalline poly(arylene sulfide) polymers, relatively less water is required when more water is present in the reaction mixture at the end of polymerization and relatively more water is required if larger amounts of poly(arylene sulfide) polymer and/or polar organic compound are present in the reaction mixture at the end of polymerization. The use of larger amounts of polar organic compound during recovery generally results in a greater reduction in the ash and oligomer content. The presence of modifying agents, such as, for example, alkali metal carboxylates, can reduce the amount of water needed to recover the polymer particles. One skilled in the art can readily determine the amount of polar organic compound and water required based on the particle size desired and the specific polymerization reaction mixture to be treated from the following disclosure without undue experimentation. For poly(arylene sulfides) such as poly(phenylene sulfide), prepared under typical polymerization conditions such as those described in U.S. Pat. No. 3,354,129 and U.S. Pat. No. 3,919,177, the following general guidelines have been developed.

In a typical polymerization, the polyhalogenated aromatic compound and alkali metal sulfide are heated and reacted with each other in the presence of a polar organic compound at a temperature in the range of about 200°-350° C. over a specific period of time. Suitable polyhalogenated aromatic compound include p-dichlorobenzene, m-dichlorobenzene, 1,3,5-trichlorobenzene, 2,6-dichloronaphthalene, 4,4'-dihalobiphenyl, 4,4'-dichlorodiphenylsulfone, 4,4'-dichlorodiphenyl ketone, and their alkyl- or phenyl-substituted derivatives.

Suitable examples of alkali metal sulfides include sodium sulfide, potassium sulfide, lithium sulfide, etc. It is also possible to use combinations of other sulfur sources which could act as precursors for the alkali metal sulfide, for example an alkali metal hydrosulfide-alkali metal hydroxide mixture, a hydrogen sulfide-alkali metal hydroxide mixture, and the like.

The polymerization occurs in the presence of a polar organic compound such as for example N-alkyllactam, N-alkylurea, N-ethylpyrrolidone, N-methylpiperidone, N-methylcaprolactam, N-ethylcaprolactam, N-methylpropionamide, N,N-dimethylacetamide, N,N-dimethylformamide, N-methylpyrrolidone, and the like.

It is preferred that the reaction mixture be dehydrated prior to polymerization to remove excess water. Optional reactants can also be added to increase the degree and/or rate of polymerization.

It is preferred that the polymerization temperature be above about 240° C. in order to increase the molecular weight of the polymer obtained. The temperature should be in the range of 240°-200° C. during a particle-forming recovery process. It is preferred that the average cooling rate be in the range of about 0.3°-10° C./min. If the cooling rate is too low, the productivity decreases. If the cooling rate is too high, very large polymer particles which adhere to the polymerization recovery vessel walls result. The water content of the reaction mixture during recovery exerts considerable effects on the porosity, yield, and particle size. It is preferred that the molar ratio of water to polar organic compound is in the range of about ¼ to 1/1 in order to obtain a polymer product having desirable particle size and porosity. The molar ratio may be controlled within the aforementioned range during the reaction, or water may be removed from or added to the reaction mixture immediately before cooling. If polymerization is conducted in a dehydrated system, it is usually necessary to add water prior to recovery. In one embodiment, when water is added, steam is also added to uniformly dissolve liquid droplets. In another embodiment, liquid droplets with sizes of 1 mm $\phi$ or smaller are dispersed using a spray nozzle. It is also within the scope of this invention to add a polar organic compound/water mixture in order to achieve the necessary molar ratios before recovery. If the water content of the reaction system is high, the yield of polymer improves, but at the same time, the porosity of the polymer particles deteriorates, and very large particles tend to be produced. If the water content is too low, the porosity of the polymer particles improves, but the yield deteriorates. Thus, water content should be controlled within an optimum range. The porosity, yield, and particle size are directly related to the melt flow rate (MF) of the product layer; it has been found that if the water content selected so that the relationship represented by the equation shown below is satisfied, a desirable product results. The flow rate (MF) is measured at 315.6° C. under a load of 5 kg/cm$^2$ using a nozzle with a diameter of 2.09 mm $\phi$ and a length of 10 mm (unit: g/10 min).

The equation is:

$$0.378 \ln MF - 0.741 \leq \text{water (mol/mol-polymer unit)} \leq 0.842 \ln MF - 0.439.$$

The reaction mixture containing the liquid-phase polymer is slowly cooled until the polymer solidifies, generally at a temperature below about 220° C., then the polar organic compound/poly(arylene sulfide) polymer ratio is maintained, by adding polar organic compound if necessary, within certain ranges in order to recover a poly(arylene sulfide) polymer characterized by a low ash and low oligomer content.

Generally the water content of the polar organic compound slurry will be in the range of 2 wt. % to 18 wt. % in order to achieve the lowering of both ash and oligomer concentrations in the polymer. As far as the present invention is concerned, the expression "water content of the polar organic compound slurry" refers to the ratio of water with respect to the combined weights of polar organic compound and water. If the water content is lower than 2 wt. %, the water solubilities of ionic impurities are low. Thus, the ash content of the poly(arylene sulfide) is high. If the water content exceeds 18 wt. %, on the other hand, it is impossible to sufficiently lower the oligomer concentration.

It has been found that the poly(arylene sulfide)/polar organic compound molar ratio in the polar organic compound slurry containing poly(arylene sulfide) should be in the range of about 1/10 to ½. If the ratio is lower than 1/10, the oligomer concentration can be sufficiently lowered, but it is disadvantageous from an economic point of view since the quantity of the polar organic compound required is large. If the ratio exceeds ½, on the other hand, it is undesirable since it is difficult to effectively lower the oligomer concentration.

The amount of agitation of the reaction system plays a part in minimizing polymer adhesion to the recovery vessel walls and producing uniform particles. It is generally necessary that the velocity of the front end of an agitation blade during an agitating process be in the range of 15 m/min. to 500 m/min. If the velocity is low, very large polymer particles tend to adhere to the wall. If the velocity is too high, on the other hand, it is undesirable since mechanical vibrations are produced and since fine particles are produced.

When the poly(arylene sulfide) is filtered from the polar organic slurry containing poly(arylene sulfide), it is necessary that the temperature be 30° C. or above and 220° C. or below. If the temperature is lower than 30° C., the oligomers become insoluble in the polar organic compound. Thus, it is difficult to effectively lower the oligomer concentration from the solidified poly(arylene sulfide) polymer. If the temperature exceeds 220° C., on the other hand, the slurry pressure increases, making it extremely difficult for the poly(arylene sulfide) to be separated from the polar organic compound containing a high oligomer concentration. It is preferred that the temperature be in the range of 50° C. to 200° C.

There are no special restrictions on procedures for filtering the polar organic compound slurry containing poly(arylene sulfide) in the present invention, and ordinary filtering devices can be used. More specifically, vibrating screens, belt filters, filter presses, centrifugal separators, etc., can be used. The vibrating screen and belt filter are preferred.

After the slurry has been filtered in the method of the present invention, it is generally washed with water and dried. As a result, a poly(arylene sulfide) in which the oligomer and ionic impurity concentrations have been lowered can be obtained which is highly useful in the production of fibers, films, and molding resin compositions.

Various additives can be mixed with the poly(arylene sulfide) obtained in the present invention. Common additives include inorganic fillers (e.g., glass fiber, carbon fiber, titanium oxide, calcium carbonate, etc.), antioxidants, heat stabilizers, ultraviolet absorbents, coloring agents, and the like.

If necessary, furthermore, other polymers such as, for example, polyamide, polysulfone, polycarbonate, polyether sulfone, polyethylene terephthalate, polybutylene terephthalate, polyethylene, polypropylene, polytetrafluoroethylene, polyether ester elastomer, and polyether amide elastomer can also be added as long as they exert no adverse effects on the objectives of the present invention.

In the following Examples the present invention will be explained in further detail. The invention is not meant to be limited in scope by these Examples but is intended to cover all reasonable changes and modifications within the spirit of the invention.

INVENTION EXAMPLES 1–4 AND COMPARATIVE EXAMPLES 1–3

These examples demonstrate the increase in particle size and porosity achieved through use of the invention method.

Approximately 1 mol of $Na_2S \cdot 9H_2O$, 2.5 mol of N-methylpyrrolidone (NMP), and 0.3 mol of sodium benzoate were placed into a 1-L SUS 316 autoclave, then the contents were heated at 220° C. under a stream of nitrogen. Then, 152 mL of water and some of the NMP were distilled and removed. Subsequently 1 mol of p-dichlorobenzene, and 0.5 mol of NMP were added. Thereafter the reactor was sealed, the contents were agitated and polymerization was conducted at 260° C. for 4 hours. A weighed amount of water was gradually added dropwise into the reaction system using a high-pressure pump immediately prior to lowering the temperature from 260° C. After the temperature had been lowered to 200° C. at an average rate of 1.2° C./min., the reaction mixture was placed into water, and a fine suspension polymer powder was removed using a 200-mesh wire net. The recovered polymer particles were washed seven times using 70° C. ion-exchange water and then dried in a vacuum. The recovery was repeated several times, employing different amounts of water and different agitation rates. The properties of polymers obtained when the volume of water and agitation rate were varied are shown in Table I. In the Table, the electroconductivity refers to the electroconductivity of an aqueous solution which was obtained by extracting each polymer using distilled water at 100° C. for 1 hour. The specific surface area was measured by the BET method.

TABLE I

|  | Invention Examples | | | | Comparative Examples | | |
| --- | --- | --- | --- | --- | --- | --- | --- |
|  | 1 | 2 | 3 | 4 | 1 | 2 | 3 |
| Quantity of Added Water (mol) | 0.5 | 1 | 1.5 | 2.0 | 0 | 1 | 4.0 |
| (Total Water/Polar Organic Compound Molar Ratio) | (1.06/3) | (1.56/3) | (2.06/3) | (2.56/3) | (0.56/3) | (1.56/3) | (4.56/3) |
| Rotary Blade Velocity (m/min) | 50 | 50 | 50 | 50 | 50 | 5 | 50 |
| Yield (%) | 88 | 88 | 90 | 94 | 75 | 90 | 93 |
| Average Particle Size (mm) | 0.8 | 1.0 | 2.1 | 4.0 | 0.08 | 9* | 15* |
| Flow rate (MF) | 65 | 70 | 71 | 75 | 60 | 90 | 70 |
| Specific Surface Area ($m^2/g$) | 40 | 35 | 30 | 20 | 52 | 12 | 8 |
| Electroconductivity | 0.4 | 0.4 | 1.7 | 2.1 | 0.3 | 18 | 21 |

TABLE I-continued

|  | Invention Examples | | | | Comparative Examples | | |
|---|---|---|---|---|---|---|---|
|  | 1 | 2 | 3 | 4 | 1 | 2 | 3 |
| (ps/cm) | | | | | | | |

*Including very large polymer particles adhering to the wall.

If MF=70 holds, the optimum quantity of water in the present invention can be computed as follows:

0.86 ≤ water (mol/mol-polymer unit) ≤ 3.14.

INVENTION EXAMPLES 5 AND 6 AND COMPARATIVE EXAMPLES 4 AND 5

Approximately 1 mol of $Na_2S \cdot 9H_2O$ and 2.5 mol of NMP were placed into a 1-L SUS316 autoclave, then the contents were heated under a stream of nitrogen at 210° C. About 155 mL of water were removed in this manner. Subsequently 1 mol of p-dichlorobenzene and 0.5 mol of NMP were added, and the reaction system had been hermetically sealed. Then the contents were agitated and subjected to polymerization conditions of 235° C. for 1 hour followed by 270° C. for 2 hours. As in the previous set of Examples recovery conditions were varied. The results are summarized in Table II. In the Comparative Examples, it was impossible to recover the polymer according to the procedures of the aforementioned Examples since the particle size was too small. For this reason, the polymer was filtered using a 4 G-grade glass filter. The product polymers were washed and dried according to procedures like those described in the previous Examples. The cooling rate was 1.0° C./min.

TABLE II

|  | Invention Examples | | Comparative Examples | |
|---|---|---|---|---|
|  | 5 | 6 | 4 | 5 |
| Quantity of Added Water (mol) | 1.0 | 2.2 | 2.0 | 0 |
| (Total Water/Polar Organic Compound Molar Ratio) | (1.39/3) | (2.59/3) | (0.11/2.9*) | (0.5/3) |
| Rotary Blade Velocity (m/min) | 60 | 60 | 60 | 60 |
| Yield (%) | 88 | 92 | 95 | 95 |
|  | Recovered using a 200-mesh wire net | | Recovered using a Glass Filter | |
| Average particle Size (mm) | 0.4 | 0.8 | 0.075 | 0.080 |
| Flow rate (MF) | 4200 | 5600 | 8200 | 7050 |
| Specific Surface Area ($m^2/g$) | 25 | 18 | 4.0 | 8.8 |
| Electroconductivity (ps/cm) | 7.5 | 9.0 | 36 | 22 |

*The solvent was partially distilled and removed while the pressure was being lowered from 12 $kg/cm^2$.

Examples 6–14 demonstrate the reduction of ash and oligomer content achieved through use of the invention method.

EXAMPLE 6

A slurry consisting of 1.0 kg-mol (108 kg) of polyphenylene sulfide (MF: 120), 8.5 kg-mol (843 kg) of N-methylpyrrolidone, 2.0 kg-mol (117 kg) of sodium chloride, 0.34 kg-mol (27.9 kg) of sodium acetate, and 1.5 kg-mol (27 kg) of water was filtered through a 200-mesh stainless steel vibrating screen at 80° C. The polyphenylene sulfide/N-methylpyrrolidone ratio was 1/8.5, and the water content of N-methylpyrrolidone was 3.1 wt. %. After the filtered slurry had been washed with 700 L of hot water at 70° C. five times, it was dried. Thus, polyphenylene sulfide was obtained. The acetone-extractable content and ash content of the resulting polyphenylene sulfide were 0.25% and 0.15%, respectively.

EXAMPLE 7

A slurry consisting of 1.0 kg-mol (108 kg) of polyphenylene sulfide, 6 kg-mol (595 kg) of N-methylpyrrolidone, 2.0 kg-mol (117 kg) of sodium chloride, 0.09 kg-mol (7.4 kg) of sodium acetate, and 3.0 kg-mol (54 kg) of water was press-filtered through a 200-mesh stainless steel filter at 180° C. The polyphenylene sulfide/N-methylpyrrolidone ratio was 1/6, and the water content of N-methylpyrrolidone was 8.3 wt. %. After the filtered slurry had been washed with 700 L of hot water at 70° C. five times, it was dried. Thus, polyphenylene sulfide was obtained. The acetone-extractable content and ash content of the resulting polyphenylene sulfide were 0.4% and 0.10%, respectively.

EXAMPLE 8

A slurry consisting of 1.0 kg-mol (108 kg) of polyphenylene sulfide, 3 kg-mol (297 kg) of N-methylpyrrolidone, and 0.42 kg-mol (7.6 kg) of water was vacuum-filtered through a belt filter equipped with a 400-mesh filter cloth at 80° C. The polyphenylene sulfide/N-methylpyrrolidone ratio was ⅓ and the water content of the N-methylpyrrolidone was 2.5 wt. %. After the filtered slurry had been washed with 700 L of hot water at 70° C. once, 700 L of water was added, and after said slurry had been press-washed at 180° C., it was filtered through a belt filter equipped with a filter cloth. After said slurry had been dried, polyphenylene sulfide was obtained. The acetone-extractable content and ash content of the resulting polyphenylene sulfide were 0.30% and 0.20%, respectively.

EXAMPLE 9

A slurry consisting of 1.0 kg-mol (108 kg) of polyphenylene sulfide, 7.3 kg-mol (724 kg) of N-methylpyrrolidone, 2.0 kg-mol (117 kg) of sodium chloride, and 3.2 kg-mol (57.6 kg) of water was filtered through a 200-mesh stainless steel vibrating screen at 80° C. The polyphenylene sulfide/N-methylpyrrolidone ratio was 1/7.3, and the water content of N-methylpyrrolidone was 7.4 wt. %. After the filtered slurry had been washed with hot water four times at 70° C., it was press-washed with 700 L of water at 180° C., and after said slurry had been dried, polyphenylene sulfide was obtained. The acetone-extractable content and ash content of the resulting polyphenylene sulfide were 0.10% and 0.02%, respectively.

EXAMPLE 10

A slurry consisting of 1.0 kg-mol (248 kg) of polyphenylene sulfide sulfone, 9.7 kg-mol (1,232 kg) of N-methyl-ε-caprolactam, 2.0 kg-mol (117 kg) of sodium chloride, and 10.7 kg-mol (193 kg) of water was filtered through a vibrating screen equipped with a 200-mesh stainless steel wire net at 80° C. The polyphenylene sulfide sulfone/N-methyl-ε-caprolactam ratio was 1/9.7, and the water content of N-methyl-ε-caprolactam was 13.5 wt. %. After the filtered slurry had been washed twice with 700 L of hot water at 70° C., it was press-washed with 700 L of water at 180° C., and after it had been dried, polyphenylene sulfide sulfone was obtained. The acetone-extractable content and ash content of the resulting polyphenylene sulfide sulfone were 0.10% and 0.05%, respectively.

EXAMPLE 11

Procedures identical to those in Example 6 were carried out except that the filtering temperature was changed to 20° C. A polyphenylene sulfide with an acetone-extractable content of 2.0% and an ash content of 0.6% was obtained.

EXAMPLE 12

Procedures identical to those in Example 6 were carried out except that the quantity of N-methylpyrrolidone was changed to 1.0 kg-mol (99 kg). A polyphenylene sulfide with an acetone-extractable content of 2.5% and an ash content of 1.0% was obtained.

EXAMPLE 13

Procedures identical to those in Example 6 were carried out except that the quatity of water was changed to 20 kg-mol (360 kg). A polyphenylene sulfide with an acetone-extractable content of 1.8% and an ash content of 0.5% was obtained.

EXAMPLE 14

Procedures identical to those in Example 6 were carried out except that the quantity of water was changed to 0.23 kg-mol (4.1 kg). A polyphenylene sulfide with an acetone-extractable content of 0.3% and an ash content of 0.8% was obtained.

The results obtained in Examples 6–14 are summarized in Table III.

tents and ash contents were obtained in Examples 6–10 of the present invention. It was more difficult to produce poly(arylene sulfides) characterized by low acetone-extractable contents and ash content when the filtering temperature deviated from the preferred range of the present invention (Example 11), when the PAS/NMP molar ratio deviated from the preferred range of the present invention (Example 12), or when the water content of the NMP deviated from the preferred range of the present invention (Examples 13 and 14).

That which is claimed is:

1. A method of recovering a poly(arylene sulfide) polymer from a liquid mixture comprising a liquid-phase poly(arylene sulfide) polymer, a polar organic compound and water, which method comprises:
   a) slowly cooling said mixture to the point of solidifying said polymer to form a polar organic compound slurry;
   b) adding or maintaining a sufficient amount of said polar organic compound to achieve a poly(arylene sulfide) polymer/polar organic compound molar ratio in the range of 1/10 to ½, wherein the water content of said polar organic compound slurry is in the range of 2 to 18 wt %;
   c) then cooling further; and
   d) recovering said poly(arylene sulfide) polymer.

2. A method according to claim 1 wherein said liquid mixture results from a polymerization reaction wherein reactants comprising a dihaloaromatic sulfone, an alkali metal sulfide, an alkali metal carboxylate, and a polar organic compound are contacted under suitable polymerization conditions.

3. A method according to claim 1 wherein said poly(arylene sulfide) is poly(phenylene sulfide).

4. A method according to claim 3 wherein the temperature of solidification of said poly(arylene sulfide polymer is below about 220° C.

5. A method according to claim 1 whrein said poly(arylene sulfide) is poly(phenylene sulfide sulfone).

6. A method according to claim 1 wherein said polar organic compound is N-methyl-2-pyrrolidone.

7. A method according to claim 1 wherein the molar ratio of said water to polar organic compound present in said liquid mixture is in the range of ¼ to 1/1.

8. A method according to claim 1 wherein said slow cooling occurs at a rate in the range of 0.3° to 10° C./min.

9. A method according to claim 1 wherein agitation of said mixture is maintained by an agitation means at a rate such that the front end velocity of said agitation means is in the range of 15 to 500 m/min.

10. A method according to claim 1 wherein said recovery of said poly(arylene sulfide) polymer is accom-

TABLE III

| Example No. | Filtering Temp (°C.) | PAS/NMP Ratio | H₂O Content (Wt. %) | Acetone Extractable Wt. % | Ash Content Wt. % |
|---|---|---|---|---|---|
| 6 | 80 | 1/8.5 | 3.1 | 0.25 | 0.15 |
| 7 | 180 | 1/6.0 | 8.3 | 0.40 | 0.10 |
| 8 | 80 | 1/3.0 | 2.5 | 0.30 | 0.20 |
| 9 | 80 | 1/7.3 | 7.4 | 0.10 | 0.02 |
| 10 | 80 | 1/9.7 | 13.5 | 0.10 | 0.05 |
| 11 | 20 | 1/8.5 | 3.1 | 2.0 | 0.6 |
| 12 | 80 | 1/1.0 | 21.4 | 2.5 | 1.0 |
| 13 | 80 | 1/8.5 | 30.0 | 1.8 | 0.5 |
| 14 | 80 | 1/8.5 | 0.5 | 0.3 | 0.8 |

As the results of Table I clearly indicate, poly(arylene sulfides) characterized by low acetone-extractable conplished by a filtration means at a temperature in the range of 30° to 220° C.

11. A method according to claim 1 wherein the amount of said water present in said liquid mixture is selected according to the equation 0.378 natural logarithym of the melt flow $-0.741 \leqq$ moles water per mole polymer unit $\leqq 0.842$ natural logarithm of the melt flow $-0.439$, wherein the melt flow is measured at 315.6° C. under a load of 5 kg/cm$^2$ using a nozzle with a diameter of 1 mm $\phi$ and a length of 10 mm.

12. A method according to claim 1 wherein said recovered poly(arylene sulfide) polymer is in the form of particles having an ash content at or below 0.5 wt. %.

13. A method according to claim 1 wherein said recovered poly(arylene sulfide) polymer is in the form of particles having an oligomer content at or below 1.5 wt. %.

* * * * *

UNITED STATES PATENT AND TRADEMARK OFFICE
CERTIFICATE OF CORRECTION

PATENT NO. : 5,128,445
DATED : July 7, 1992
INVENTOR(S) : Lacey E. Scoggins; Toshiuki Asakura; and Keiji Nakagawa It is certified that error appears in the above-identified patent and that said Letters Patent is hereby corrected as shown below:

Col. 10, claim 1, line 11, delete "$\frac{1}{2}$" and insert --- 1/2 ---.

Col. 11, claim 11, line 8, delete "0.741-" and insert --0.741--.

Signed and Sealed this

Nineteenth Day of October, 1993

Attest:

BRUCE LEHMAN

*Attesting Officer*  *Commissioner of Patents and Trademarks*